United States Patent [19]

Lallier

[11] Patent Number: 5,980,626

[45] Date of Patent: Nov. 9, 1999

[54] AQUEOUS COMPOSITIONS FOR STRIPPING PAINTS AND PRIMERS WITH A HIGH DEGREE OF CROSSLINKING

[75] Inventor: Jean-Pierre Lallier, Courbevoie, France

[73] Assignee: Elm Atochem S.A., Puteaux, France

[21] Appl. No.: 08/987,137

[22] Filed: Dec. 8, 1997

[30] Foreign Application Priority Data

Dec. 6, 1996 [FR] France .................................. 96 15041

[51] Int. Cl.⁶ ................ C08L 1/00; C08L 3/00; C08L 1/08; B08B 7/00

[52] U.S. Cl. .................... 106/162.8; 106/172.1; 106/173.01; 106/790.1; 106/192.1; 106/194.1; 106/200.1; 106/205.01; 106/205.1; 106/205.6; 134/38

[58] Field of Search ............ 106/162.8, 172.1, 106/173.01, 190.1, 192.1, 194.1, 200.1, 205.01, 205.1, 205.6; 134/38

[56] References Cited

U.S. PATENT DOCUMENTS

| | | | |
|---|---|---|---|
| 5,405,548 | 4/1995 | Distaso | 252/170 |
| 5,411,678 | 5/1995 | Sim | 252/548 |
| 5,487,789 | 1/1996 | Sim | 134/38 |
| 5,696,072 | 12/1997 | Nercissiantz et al. | 510/206 |

FOREIGN PATENT DOCUMENTS 0 497 130   8/1992   European Pat. Off. .

OTHER PUBLICATIONS

Database WPI, Week 8948, AN 89–350370 (ES 2 008 593), Derwent Publications, Ltd., London GB., 1989.

*Primary Examiner*—Nathan M. Nutter
*Attorney, Agent, or Firm*—Millen, White, Zelano & Branigan, P.C.

[57] ABSTRACT

This composition for stripping paints coating a substrate, in particular for stripping paints and primers with a high degree of crosslinking, in particular of the epoxy, polyurethane and alkyd type, is characterized in that it consists of or comprises: (A) 50 to 80 parts by weight of water; (B) 20 to 50 parts by weight of benzaldehyde and/or of benzyl alcohol; (C) 5 to 15 parts by weight of at least one activator chosen from formic acid, formic acid totally or partially neutralized with a base, and bases; and (D) 0.5 to 10 parts by weight of at least one thickener, the said thickener necessarily being a thickener of acrylic nature when (B) consists solely of benzyl alcohol, (A)+(B) representing 100 parts by weight.

20 Claims, No Drawings

1

AQUEOUS COMPOSITIONS FOR STRIPPING PAINTS AND PRIMERS WITH A HIGH DEGREE OF CROSSLINKING

CROSS-REFERENCE TO RELATED APPLICATIONS

This application is related to the following concurrently filed applications: Attorney Docket No.: CHAIL 25, Ser. No. 08/987,138 filed Dec. 8, 1997 entitled "Composition for Stripping Paints, Varnishes or Lacquers" by Jean-Pierre Lallier, based on French Priority applications 96/15042 and 97/02345 filed Dec. 6, 1996 and Feb. 27, 1997, respectively; and Attorney Docket No.: CHAIL 27, Ser. No. 08/986,407 filed Dec. 8, 1998 entitled "Composition for Stripping Paints, Varnishes or Lacquers" by Lallier, Marie, Aubry, Marti, and Del Nero, based on French Priority application 96/15040 filed Dec. 6, 1996, all of these applications being incorporated by reference herein.

FIELD OF THE INVENTION

The present invention relates to an aqueous composition for stripping primers and paints with a high degree of crosslinking, for example aircraft primers and paints, in particular of the epoxy, polyurethane and alkyd type.

BACKGROUND OF THE INVENTION

Aircraft primers and paints are among the most difficult paints to strip. An aircraft is stripped every 5 to 10 years for aesthetic reasons, and also in order to reveal possible faults in the aircraft structure. Aircraft paints are often highly crosslinked two-component paints. High-altitude flying amplifies this initial crosslinking by the UV radiation emitted by the sun. This produces areas which are more crosslinked than others depending on their degree of UV exposure. It is common, for these areas, to add stripper and to leave it to act for longer. An aircraft is stripped by spraying it with a thickened stripper which must not run down vertical walls.

The stripper is left to act for a certain period (rarely less than one hour in the case of stripping aircraft), and is then rinsed off with a jet of pressurized water. The flakes and shreds of paint are then carried away by the water through a grille into a catch pit. After settling in the catch pit, the sludge is incinerated and the liquid phase is distilled.

For environmental and toxicity reasons, it is currently sought to replace aircraft strippers based on methylene chloride and/or phenol (Ind. Finish 45(10) 1969, 28–31). These two compounds have proven to be very effective at stripping aircraft, especially in the presence of an acidic or alkaline activator, but they pollute the environment. In order to strip aircraft primers and paints (of the polyurethane, epoxy and alkyd type), it is necessary to use a very effective solvent base. The development of aqueous formulations containing a solvent fraction is particularly advantageous in order to limit the environmental and toxicity problems. It will thus be sought to incorporate as much water as possible into the formulations and to limit the contents of toxic products.

For this application, effective formulations based on benzyl alcohol have already been developed. These are water/benzyl alcohol emulsions activated with an acid or a base. American patent U.S. Pat. No. 5,405,548 describes a mixture based on benzyl alcohol, water and formic acid for stripping aircraft. According to the authors, the efficacy of their stripper is due to the "benzyl formate" ester formed in situ in the course of formulation, that is to say during mixing between the benzyl alcohol and the formic acid. Benzyl formate is thought to be the active compound and, on account of its cost, it is much more advantageous to synthesize it during the formulation operation than to introduce it as a constituent.

SUMMARY OF THE INVENTION

Thus, other compositions are sought for stripping paints, of the type mentioned above, that are superior to the known compositions in terms of performance and/or in terms of the high water content. It has, inter alia, been shown that an aircraft stripping formulation does not necessarily need to contain benzyl formate in order to be effective.

The compositions which have thus been developed and which are thus in accordance with the present invention are characterized in that they consist of or comprise:

(A) 50 to 80 parts by weight of water;
(B) 10 to 50 parts by weight of benzaldehyde and/or of benzyl alcohol;
(C) 5 to 15 parts by weight of at least one activator chosen from formic acid, formic acid totally or partially neutralized with a base, and bases; and
(D) 0.5 to 10 parts by weight of at least one thickener, the said thickener necessarily being a thickener of acrylic nature when (B) consists solely of benzyl alcohol, (A)+(B) representing 100 parts by weight.

The bases which can form part of the composition of (C) are chosen in particular from ethanolamine, triethanolamine, aqueous ammonia, ethylenediamine, ammonium carbonate and pyrrole.

The thickener(s) (D) is (are) chosen in particular from acrylic thickeners and cellulosic thickeners such as hydroxyethyl cellulose and hydroxypropyl methyl cellulose, and xanthan gum. As a specific example of a cellulosic thickener, mention may be made of Methocell 311, sold by the company Dow Chemical Co., whose production process is described in American patent U.S. Pat. No. 3,388,082 entitled "Hydroxypropyl methyl cellulose ethers". As a specific example of an acrylic thickener, mention may be made of the acrylic resin sold under the name "Carbopol" by the company Goodrich, BF, Co., whose production process is described in American patent U.S. Pat. No. 4,419,502 entitled "Polymerization process for carboxyl-containing polymers". In particular, it has been shown, entirely unexpectedly, that in the presence of an acrylic thickener instead of a cellulosic thickener, compositions having a higher water content and/or compositions which are at least as effective (cf. Ex. 5 and 13 of Table 1) can be obtained. Thickening with a cellulosic derivative requires the use of surfactants which stabilize the emulsion and make it less active. In general, the more unstable an emulsion, the more active it will be in the intended application. Thus, in accordance with a particular embodiment of the present invention, the stripping composition contains an acrylic thickener (D) and is free of surfactant.

The composition according to the present invention can also contain:

at least one corrosion inhibitor chosen in particular from sodium benzoate, monoethanolamine, triethanolamine and citric acid, for example in a proportion of from 0.1 to 10 parts by weight per 100 parts by weight of (A)+(B) (monoethanolamine and triethanolamine also act as activator (C));

at least one evaporation retardant such as paraffin, for example in a proportion of from 0.1 to 10 parts by weight of (A)+(B).

The examples which follow illustrate the present invention without, however, limiting the scope thereof.

EXAMPLES 1 to 13

Each of the stripping compositions was prepared by mixing together the constituents as indicated in Table 1 below, at room temperature.

Each composition is applied to an aluminium substrate coated with the paint which it is desired to strip. The four test paints, also defined in Table 1, were pre-applied to an aluminium substrate and dried.

The time for appearance of removal of the paint, which occurs suddenly and even produces a characteristic noise, is measured.

TABLE 2

| EXAMPLE | 14 | 15 | 16 |
|---|---|---|---|
| System with a polyurethane finishing layer A104 | 135 | 88–96 | 200–300 |
| System with an epoxy finishing layer A105 | 112 | 271–420 | 425–(>480) |

EXAMPLES 17 to 20

The following compositions were prepared (constituents and their amounts in parts by weight):

TABLE 1

| | Example | Reference (1) | 1 | 2 | 3 | 4 | 5 | 6 | 7 | 8 | 9 | 10 | 11 | 12 | 13 |
|---|---|---|---|---|---|---|---|---|---|---|---|---|---|---|---|
| Constituents (in parts by weight) | Water | | 70 | 70 | 70 | 70 | 70.3 | 75.3 | 75.3 | 75.3 | 75.3 | 75.3 | 75.3 | 75.3 | 58.2 |
| | Benzaldehyde | | 20 | 20 | 20 | 20 | 17.6 | 0 | 4.7 | 8.2 | 11.8 | 16.5 | 20 | 24.7 | 41.8 |
| | Benzyl alcohol | | 10 | 10 | 10 | 10 | 12.1 | 24.7 | 20 | 16.5 | 12.9 | 8.2 | 4.7 | 0 | 0 |
| | Formic acid | | 5 | 8 | 9 | 10 | 5.5 | 11.8 | 11.8 | 11.8 | 11.8 | 11.8 | 11.8 | 11.8 | 9.9 |
| | Acrylic thickener (2) | | 5 | 4 | 4 | 4 | 37 | 4.1 | 4.1 | 41 | 41 | 4.1 | 4.1 | 4.1 | 3.3 |
| Water content of the total composition | (% by weight) | 55 | 63.6 | 62.5 | 61.9 | 61.4 | 64.4 | 65 | 65 | 65 | 65 | 65 | 65 | 65 | 51.4 |
| Formic acid content of the total composition | (% by weight) | 8.2 | 4.5 | 7.1 | 8.0 | 8.8 | 5.0 | 10.2 | 10.2 | 10.2 | 10.2 | 10.2 | 10.2 | 10.2 | 8.7 |
| Time (in minutes) for appearance of removal of the paint to be stripped | Polyurethane (S/ST 76 PK HFA 130) + Alodine 1200 pretreatment (3) | 163 | 120 | 120 | 148 | 129 | 164 | | | | | | | | 140 |
| | Air-France polyurethane | 130 | | | | | | | | | 45 | | | | |
| | Polyurethane A104 finishing layer system (4) | 90 | 90 | | | | 90 | 68 | 64 | 76 | 63 | 66 | 71 | 78 | |
| | Epoxy A105 finishing layer system (5) | 60 | 100 | | | | 90 | 50 | 48 | 52 | 47 | 48 | 48 | 46 | |

(1) Composition sold under the name "Turco 6776" by the company "Elf Atochem N.A."; this stripper comprises 55% water, 20.6% benzyl alcohol, 7.2% benzyl formate derived from the reaction benzyl alcohol + formic acid, 8.2% formic acid, the remainder consisting of the thickener and the other additives. This product is referred to in the aircraft stripping sector.
(2) Carbopol (defined above).
(3) Pretreatment of the aluminium before painting.
(4) Polyurethane "top coat" system consisting of an epoxy-polyamide primer and two urethane/aliphatic isocyanate layers.
(5) Epoxy "top coat" system also consisting of an epoxy-polyamide primer, and then of two epoxy-polyamide layers.

The formulations of Examples 12 and 13 show that the presence of benzyl alcohol is not necessary to obtain good efficacy. The absence of formation of benzyl formate, which is normally formed from the esterification of benzyl alcohol with formic acid, has been confirmed, by $^1$H NMR, in the case of the formulation of Example 12.

EXAMPLES 14 to 16

Compositions identical to that of Example 7 were prepared, except that triethanolamine was added in an amount such that the formic acid+triethanolamine represent 11.8 parts by weight, the formic acid/triethanolamine molar ratios being, respectively, 3 (Example 14); 1.5 (Example 15) and 1 (Example 16). The water content of the total composition is 65% by weight.

The times(in minutes) for appearance of removal of the paint to be stripped on the systems with finishing layers A104 and A105 defined in Table 1 are given in Table 2. These times remain shorter than those obtained with the commercial alkaline formulations Turco 6813 E and Turco 6840 S, which are longer than 480 minutes.

TABLE 3

| EXAMPLE | 17 | 18 | 19 | 20 |
|---|---|---|---|---|
| Water | 75.3 | 75.3 | 70.3 | 75.3 |
| Benzaldehyde | 8.2 | 8.2 | 9.9 | 0 |
| Benzyl alcohol | 16.5 | 16.5 | 19.8 | 24.7 |
| Acrylic thickener (2) | 0.6 | 1.03 | 1.6 | 0.8 |
| NH$_3$ (aqueous 28% by weight solution) | 11.8 | | | |
| H$_2$NCH$_2$CH$_2$NH$_2$ | | 11.8 | | |
| (NH$_4$)$_2$CO$_3$ | | | 6.04 | |
| Pyrrole | | | | 5.9 |
| Total water content (% by weight) | 67 | 66.7 | 65.3 | 70.6 |

The time for appearance of removal of the paint is longer than 480 minutes and of the same order as those obtained with the commercial alkaline formulations Turco 6813 E and 6840 S. It is moreover observed that the acrylic thickener is found at a lower content, as a result of the reactivity of carboxylic groups of the acrylic resin, which leads to a much higher thickening power (cleavage of the H bonds, deballing).

The preceding examples can be repeated with similar success by substituting the generically or specifically described reactants and/or operating conditions of this invention for those used in the preceding examples.

The entire disclosure of all applications, patents and publications, cited above and below, and of corresponding French application 96/15041, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

I claim:

1. A composition for stripping paints and primers from a substrate obtained by mixing the following constituents:
   (A) 50 to 80 parts by weight of water;
   (B) 20 to 50 parts by weight of benzaldehyde or a mixture of benzaldehyde with benzyl alcohol;
   (C) 5 to 15 parts by weight of at least one activator selected from the group consisting of formic acid, formic acid totally or partially neutralized with a base, and bases; and
   (D) 0.5 to 10 parts by weight of at least one thickener,
   (A)+(B) equal 100 parts by weight.

2. A stripping composition according to claim 1, wherein the bases are chosen from selected from group consisting of ethanolamine, triethanolamine, aqueous ammonia, ethylenediamine, ammonium carbonate and pyrrole.

3. A stripping composition according to claim 1, wherein the thickener(s) (D) is an acrylic thickener, a cellulosic thickener, or xanthan gum.

4. A stripping composition according to claim 1, further comprising at least one corrosion inhibitor selected from the group consisting of sodium benzoate, monoethanolamine, triethanolamine and citric acid, in a proportion of from 0.1 to 10 parts by weight per 100 parts by weight of (A)+(B).

5. A stripping composition according to claim 1, further comprising at least one evaporation retardant, in a proportion of from 0.1 to 10 parts by weight of (A)+(B).

6. A stripping composition according to claim 5, wherein the evaporation retardant is paraffin.

7. A stripping composition according to claim 1, wherein the thickener is hydroxyethyl cellulose or hydroxypropyl methyl cellulose.

8. A stripping composition according to claim 1, wherein (B) is solely benzaldehyde.

9. A stripping composition according to claim 2, wherein (B) is solely benzaldehyde.

10. A stripping composition according to claim 3, wherein (B) is solely benzaldehyde.

11. A stripping composition according to claim 4, wherein (B) is solely benzaldehyde.

12. A stripping composition according to claim 5, wherein (B) is solely benzaldehyde.

13. A method of stripping paints and primers from airplane parts, said method comprising applying a composition according to claim 1 to an airplane part for a sufficient time to strip the paint or primer.

14. A method of stripping paints and primers from airplane parts, said method comprising applying a composition according to claim 8 to an airplane part for a sufficient time to strip the paint or primer.

15. A composition for stripping paints and primers from a substrate, obtained by mixing the following constituents:
   (A) 50 to 80 parts by weight of water;
   (B) 20 to 50 parts by weight of an aromatic organic solvent consisting of benzyl alcohol;
   (C) 5 to 15 parts by weight of at least one activator selected from the group consisting of formic acid, formic acid totally or partially neutralized with a base, and bases; and
   (D) 0.5 to 10 parts by weight of at least one thickener, said thickener being exclusively an acrylic thickener,
   (A)+(B) equal 100 parts by weight,
said composition being free of surfactant.

16. A stripping composition according to claim 15, wherein the bases are selected from the group consisting of ethanolamine, triethanolamine, aqueous ammonia, ethylenediamine, ammonium carbonate and pyrrole.

17. A stripping composition according to claim 15, further comprising at least one corrosion inhibitor selected from the group consisting of sodium benzoate, monoethanolamine, triethanolamine and citric acid, in a proportion of from 0.1 to 10 parts by weight per 100 parts by weight of (A)+(B).

18. A stripping composition according to claim 15, further comprising at least one evaporation retardant, in a proportion of from 0.1 to 10 parts by weight of (A)+(B).

19. A stripping composition according to claim 5, wherein the evaporation retardant is paraffin.

20. A method of stripping paints and primers from airplane parts, said method comprising applying a composition according to claim 15 to an airplane part for a sufficient time to strip the paint or primer.

* * * * *

UNITED STATES PATENT AND TRADEMARK OFFICE
CERTIFICATE OF CORRECTION

PATENT NO. : 5,980,626
DATED : November 9, 1999
INVENTOR(S) : Jean -Pierre Lallier It is certified that error appears in the above-indentified patent and that said Letters Patent is hereby corrected as shown below:

On the title page: Item [73] Assignee: change "ELM ATOCHEM S.A. " to
-- ELF ATOCHEM S. A. --.

Signed and Sealed this

Third Day of April, 2001

Attest:

NICHOLAS P. GODICI

*Attesting Officer*   *Acting Director of the United States Patent and Trademark Office*